United States Patent
Kurisu et al.

(10) Patent No.: US 11,861,151 B2
(45) Date of Patent: Jan. 2, 2024

(54) INFORMATION PROCESSING DEVICE, PROGRAM, AND INFORMATION PROVIDING SYSTEM

(71) Applicant: JAPAN TOBACCO INC., Tokyo (JP)

(72) Inventors: Toshiharu Kurisu, Tokyo (JP); Yusuke Okamura, Tokyo (JP); Yoshiyuki Habashima, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/783,100

(22) PCT Filed: Dec. 1, 2020

(86) PCT No.: PCT/JP2020/044639
§ 371 (c)(1),
(2) Date: Jun. 7, 2022

(87) PCT Pub. No.: WO2021/117545
PCT Pub. Date: Jun. 17, 2021

(65) Prior Publication Data
US 2023/0004279 A1 Jan. 5, 2023

(30) Foreign Application Priority Data
Dec. 13, 2019 (JP) .................................. 2019-225720

(51) Int. Cl.
*G06F 3/04842* (2022.01)
*G06F 3/01* (2006.01)

(52) U.S. Cl.
CPC .......... *G06F 3/04842* (2013.01); *G06F 3/011* (2013.01)

(58) Field of Classification Search
CPC .............................. G06F 3/04842; G06F 3/011
See application file for complete search history.

(56) References Cited

U.S. PATENT DOCUMENTS

2008/0160147 A1* 7/2008 Tormey ..................... G09F 3/02
426/383
2010/0107785 A1* 5/2010 Kugimiya ............ G01N 27/327
73/865.7

(Continued)

FOREIGN PATENT DOCUMENTS

CN        109325383 A      2/2019
JP      2016-180830 A     10/2016

(Continued)

OTHER PUBLICATIONS

Mar. 9, 2021 International Search Report issued in International Patent Application No. PCT/JP2020/044639.

(Continued)

*Primary Examiner* — Nhat Huy T Nguyen
(74) *Attorney, Agent, or Firm* — Oliff PLC

(57) ABSTRACT

The relationship between the smell or taste of an object and the expression of the smell or taste can be grasped, and the user can grasp what smell or taste they prefer. In the single-sample display mode, a system displays a group of expressions relating to the olfactory sense stimulated by a sample, and if any expression is selected by the user, the system displays a relationship image indicating the relationship between the selected expression and other samples corresponding to the olfactory sense associated with the expression. In addition, in the multiple-sample display mode, the system displays, for each of plural samples, a group of expressions relating to the sense of smell stimulated by each sample, and displays an expression common to plural samples among the group of expressions.

6 Claims, 7 Drawing Sheets

(56) References Cited

U.S. PATENT DOCUMENTS

2017/0017944 A1* 1/2017 Sasahara .............. G06Q 20/201
2017/0131689 A1  5/2017 Chan et al.
2020/0163487 A1* 5/2020 Kihara ................... G07F 13/00

FOREIGN PATENT DOCUMENTS

WO  2015/114785 A1  8/2015
WO  2019/031363 A1  2/2019
WO  2019/211243 A1  11/2019

OTHER PUBLICATIONS

Jun. 1, 2023 Office Action issued in Chinese Patent Application No. 202080085623.7.
Oct. 24, 2023 Extended European Search Report issued in European Patent Application No. 20899437.6.

* cited by examiner

| SAMPLE ID | FIRST EXPRESSION | APPEARANCE OF FIRST EXPRESSION | SECOND EXPRESSION | APPEARANCE OF SECOND EXPRESSION | THIRD EXPRESSION | APPEARANCE OF THIRD EXPRESSION | ... | Nth EXPRESSION | APPEARANCE OF Nth EXPRESSION |
|---|---|---|---|---|---|---|---|---|---|
| ID001 | SWEET | POSITION: X1,Y1<br>COLOR: RED<br>FONT: GOTHIC<br>SIZE: 25pt<br>MOTION: FLASHING | FRESH | ... | FLOWER | ... | ... | ... | ... |
| ID002 | REFRESHING | ... | CLEAN | ... | ... | ... | ... | ... | ... |
| ID003 | CLEAR | ... | SMALL STREAM | ... | ... | ... | ... | ... | ... |
| ID004 | GORGEOUS | ... | WOODY | ... | ... | ... | ... | ... | ... |
| ID005 | ... | ... | ... | ... | ... | ... | ... | ... | ... |
| ID006 | ... | ... | ... | ... | ... | ... | ... | ... | ... |
| ID007 | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

FIG. 4

INFORMATION PROCESSING DEVICE, PROGRAM, AND INFORMATION PROVIDING SYSTEM

TECHNICAL FIELD

The present invention relates to a technique for providing information on the smell or taste of an object.

RELATED ART

Smell is known to exert various effects on humans by acting on the cerebral limbic system that controls human emotion, behavior, and storage. For example, Patent Document 1 describes that a subject who smells a smell is asked questions about a mental event recalled by sniffing the smell, and the answer is acquired as a numerical value.

PRIOR ART

Patent Document

Patent document 1: JP 2016-180830

SUMMARY

Problem to be Solved

Incidentally, it is not so easy to accurately express what kind of smell a certain smell is and what kind of smell the user himself/herself prefers, and to convey it to others. This is probably due to the fact that most people have little chance to express the smell, so they have little vocabulary to express the smell, and they have not been able to accurately recognize the correspondence between the smell and the expression of the smell. Such a situation is not limited to the smell of the object, and the same applies to the taste of the object.

Therefore, the present invention provides a mechanism capable of grasping the relationship between the smell or taste of an object and the expression of the smell or taste, and grasping what smell or taste the user himself/herself likes.

Solution

According to one aspect of the invention, there is provided an information processing device including: an identifying means that identifies an object selected by the user among a plurality of objects that stimulate the user's sense of smell or taste; a display control means that displays a group of expressions relating to the sense of smell or taste stimulated by the identified object; a switching means that switches between the first display mode and the second display mode, wherein the display control means is configured: to display, in the first display mode, the expression group relating to one object identified by the identifying means, and to display, in the second display mode, the expression group relating to each of the plurality of objects identified by the identifying means, in addition to the expression common to the plurality of objects among the expression group so as to be distinguishable from the expression not common to the plurality of objects.

The display control means may be configured to display, in the first display mode, the expression group relating to one object identified by the identifying means, and to display a relationship image, which is an image indicating a relationship between the selected expression and other object corresponding to the sense of smell or taste associated with the expression, in a case that any one of the displayed expression groups is selected by the user.

A plurality of objects corresponding to the sense of smell or taste may be placed on the user interface device. The identifying means may be configured to identify an object selected by the user among a plurality of objects that stimulate the user's sense of smell or taste. The display control means may be configured to control to: display, in the first display mode, the expression group relating to one object identified by the identifying means, around the predetermined position where the object is placed, display on the user interface device, an image indicating the relationship between the selected expression and another object corresponding to the sense of smell or taste associated with the expression, which is an image corresponding to the position where the other object is placed, in a case that any one of the displayed expression groups is selected by the user.

According to another aspect of the invention, there is provided a program to implement functions to a computer, the functions including: an identifying means that identifies an object selected by the user among a plurality of objects that stimulate the user's sense of smell or taste;

a display control means that displays a group of expressions relating to the sense of smell or taste stimulated by the identified object; a switching means that switches between the first display mode and the second display mode, wherein the display control means is configured to control to: display, in the first display mode, the expression group relating to one object identified by the identifying means, and display, in the second display mode, the expression group relating to each of the plurality of objects identified by the identifying means, in addition to the expression common to the plurality of objects among the expression group so as to be distinguishable from the expression not common to the plurality of objects.

According to yet another aspect of the invention, there is provided an information providing system including: a user interface device; and an information processing device including: an identifying means that identifies an object selected by the user among a plurality of objects that stimulate the user's sense of smell or taste; a display control means that displays a group of expressions relating to the sense of smell or taste stimulated by the identified object; a switching means that switches between the first display mode and the second display mode, wherein the display control means is configured: to display, in the first display mode, the expression group relating to one object identified by the identifying means, and to display, in the second display mode, the expression group relating to each of the plurality of objects identified by the identifying means, in addition to the expression common to the plurality of objects among the expression group so as to be distinguishable from the expression not common to the plurality of objects.

The information provision system may further include: an object tag, which is a tag provided in each of the objects and storing identification information, a tray tag which is a tag provided on a tray on which the object is placed and which stores identification information, wherein the identifying means is configured to identify the objects by the identifying means reading the object tag provided on the object to identify the object in a case that any of the plurality of objects is placed at a predetermined position of the user interface device, and identify, in a case that the tray is placed in a predetermined position of the user interface device, the switching means reads the tray tag provided in the tray to switch between the first display mode and the second display mode.

Advantageous Effects

According to the present invention, the relationship between the smell or taste of an object and the expression of the smell or taste can be grasped, and the user himself/herself can grasp what smell or taste he/she prefers.

BRIEF DESCRIPTION OF THE DRAWINGS

FIG. 4 is a diagram showing an example of an expression DB stored in the information processing device.

DETAILED DESCRIPTION

Configuration

Figure 1:
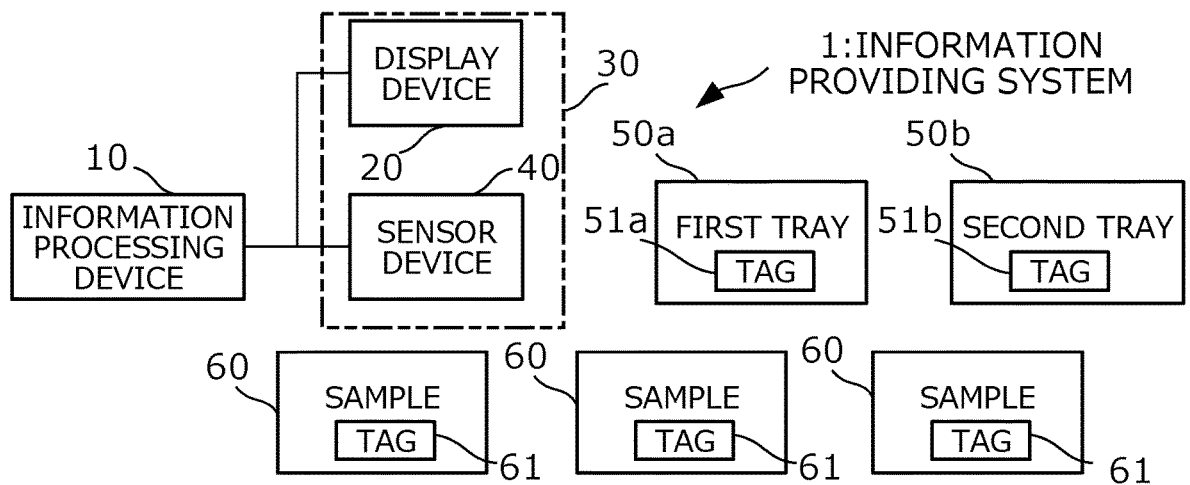
FIG. 1 is a block diagram illustrating an overall configuration of an information providing system according to an embodiment of the present invention.

First, an overall configuration of information providing system 1 according to an embodiment of the present invention will be described. Information providing system 1 is a system which enables a user to visually grasp the relationship between smell of an object and an expression of the smell, and to provide information for grasping what kind of smell the user himself/herself prefers. As shown in FIG. 1, information providing system 1 includes information processing device 10, display device 20, sensor device 40, first tray 50a, second tray 50b, and plural samples 60. Information processing device 10, display device 20 and sensor device 40 are connected each other to communicate. Information processing device 10 is an example of an information processing device according to the present invention, and is a device for central control in information providing system 1. Display device 20 is an example of a display device for displaying information to a user. Sensor device 40 is an example of an operation device that receives an input operation of a user. Display device 20 and sensor device 40 constitute user interface device 30 that receives information provision to the user and instructions from the user.

Each of plural samples 60 is an object that emits a smell that stimulates the user's sense of smell. For example, sample 60 may be a smelled natural product (e.g., a plant itself such as a lavender) or an artificial product containing its smell (e.g., a volatile liquid from which the smell of a lavender has been extracted, a sheet impregnated with the liquid, or the like) In this embodiment, as sample 60, a cylindrical small bottle with a lid containing a liquid called an aroma oil containing a smell extracted from a natural product emitting a smell is used. Each sample 60 is provided with a seal or tag bearing the name or ID of the sample (e.g., the plant name "Lavender" or the number "1"). The user can visually identify each sample by referring to this name or ID.

First tray 50a and second tray 50b function as an operating tool for switching the display mode of display device 20. Both first tray 50a and second tray 50b have a size and a shape that allow sample 60 to be placed thereon. Both first tray 50a and second tray 50b have a size and shape so as to be superposed on each other.

Figure 2:
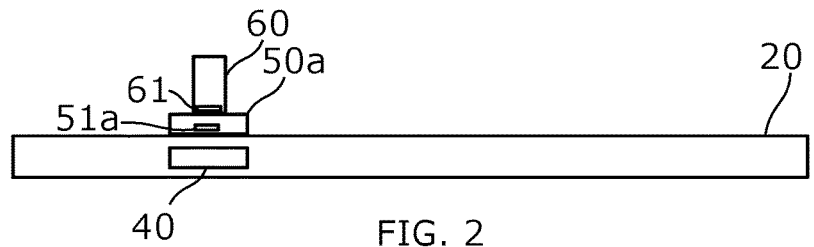
FIG. 2 is a side view illustrating the structure of the information providing system.

FIG. 2 is a side view illustrating a structure of information providing system 1, and more specifically, a positional relationship when display device 20, sensor device 40, first tray 50a, and sample 60 are viewed from the horizontal direction. Display device 20 has, for example, a thin rectangular plate shape, the upper surface of which has a horizontal display surface. Sensor device 40 is incorporated in a portion of display device 20. In first tray 50a and second tray 50b, tag 51a (first tray tag) and tag 51b (second tray tag) are provided respectively, each of which is a storage medium storing identification information (called a tray ID) for identifying each tray. As illustrated in FIG. 2, if first tray 50a is placed on the display surface (that is, a user interface surface corresponding to a predetermined position of the user interface device 30, hereafter referred to as "sensing surface") of display device 20 of the area in which sensor device 40 can sense the tray, for example, sensor device 40 reads the tray ID stored in tag 51a of first tray 50a using a short-distance wireless communication standard called NFC (Near Field Communication) and identifies that first tray 50a has been placed. In this case, the display mode of display device 20 is switched to a first display mode called a "single-sample display mode". The single-sample display mode is a display mode on the assumption that only one sample 60 is placed on the sensing surface. In addition, second tray 50b may be stacked on first tray 50a. If first tray 50a and second tray 50b are placed on the sensing surface, sensor device 40 reads the two tray IDs stored in tag 51a of first tray 50a and tag 51b of second tray 50b, thereby identifying that first tray 50a and second tray 50b are placed. In this case, the display mode of display device 20 is switched to a second display mode called a "multi-sample display mode". The multiple sample display mode is a display mode on the assumption that plural samples 60 are placed on the sensing surface.

Sample 60 is provided with a tag 61 (object tag) which is a storage medium storing identification information (referred to as a sample ID) for identifying each sample. When sample 60 is placed on the sensing surface, sensor device 40 identifies the placed sample 60 by reading the sample ID stored in the tag 61 of sample 60.

Display device 20 also functions as a so-called touch screen, and detects a touched position on the display surface if, for example, a user touches the display surface with his/her finger or a predetermined device. The position touched by the user is expressed as X and Y coordinates in a two-dimensional coordinate plane with a certain position of the display surface as the origin.

Figure 3:
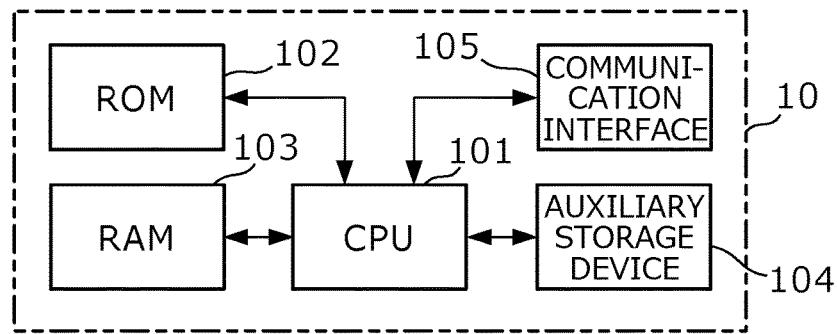
FIG. 3 is a block diagram showing an example of a hardware configuration of an information processing device according to an embodiment of the present invention.

FIG. 3 exemplary shows a hardware configuration of information processing device 10. Information processing device 10 is a computer that includes CPU101 (Central Processing Unit), ROM (Read Only Memory) 102, RAM (Random Access Memory) 103, auxiliary storage device 104, and communication IF (Interface) 105.

CPU101 is a processor that performs various operations. ROM102 is, for example, a non-volatile memory that stores a program and data used for starting information processing device 10. RAM103 is a volatile memory that functions as a work area while CPU101 executes a program. The secondary storage device 104 is a nonvolatile storage device such as an HDD (Hard Disk Drive) or an SSD (Solid State Drive), and stores programs and data used in information processing device 10. CPU101 executes this program to implement the functions described later, and also executes the operations described later. The communication IF105 is an interface for performing communication according to a predetermined communication standard. The communication standard may be a standard of wired communication or a standard of wireless communication. In addition to the configuration illustrated in FIG. 3, information processing device 10 may include other elements such as a display device (for example, as a liquid crystal display) or an input device (for example, a keyboard).

The auxiliary storage device 104 stores an expression database (hereinafter, the term "database" is referred to as a DB) as shown in FIG. 4. In this expression DB, a sample ID and one or more expressions (that is, one or more expressions which expressed the smell of sample 60 by the character strings) about the smell stimulated by sample 60 corresponding to the sample ID, are recorded with their correspondence. That is, the expression is used as a means for communicating the smell of sample 60 to others when the user smells the smell. This expression may be an expression using any part of speech, such as a noun or adjective, and covers from direct to indirect expression of the smell. Here, the direct expression refers to an expression commonly used to recall an idea of a smell, for example, "sweet" or "fruity", while the indirect expression refers to an expression that is not commonly used to recall an expression of a smell as compared with the direct expression described above, for example, "spring", "morning" or "walking". The indirect expression is a secondary expression that is recalled from a direct expression with respect to the direct expression, and may be an expression that abstractly represents a smell compared to the direct expression.

Further, the expression DB includes information of an appearance for displaying each expression. The appearance includes, for example, a position where the expression is displayed, a color with which the expression is displayed, a size of the displayed expression, a font of the expression, a modification for displaying the expression, a time when the expression is displayed, a time to display an expression, a time period when the expression is displayed, a motion (including a spatial or temporal change in an expression) of the expression, a language used for the expression, and the like.

This appearance changes depending on the relationship between sample 60 and the expression. The relationship between sample 60 and the expression is the intensity or amount of the smell (more strictly, the component contained in the smell of the sample) represented by the expression thereof in sample 60, or the abstraction degree of the expression thereof with respect to the smell, and the like. For example, for sample 60 having strong sweet smell, the expression "sweet" is displayed near sample 60, with a large font or a conspicuous color, or with a motion in which the expression is vibrating. These are examples of the appearance that varies depending on the relationship between sample 60 and the expression changes. In addition, for example, for a sample having a strong smell of "sweet" and a weak smell of "fruity", an expression of "sweet" is displayed near the sample and the expression of "fruity" is displayed far from the sample. This is another example of an appearance which changes in accordance with the relationship between sample 60 and the expression. Further, in the case where a direct expression and an indirect expression are associated with a certain sample, the distance between sample 60 and the expression changes in accordance with the abstraction of the expression, for example, a direct expression is displayed near the sample and an indirect expression is displayed far from the sample. This is yet another example of an appearance which changes in accordance with the relationship between sample 60 and the expression. In short, the expression is displayed with an appearance such that the content of the relationship between sample 60 and the expression (specifically, the strength and weakness of the relationship and the manner of the relationship) can be visually recognized.

In FIG. 4, for sample 60 having the sample ID "ID001," the record has the first expression "sweet," the second expression "fresh," and the third expression "flower." Among these expressions, the appearance of the first expression, which is "sweet," corresponds to the position (X, Y coordinates) at which the expression is displayed is (X1, Y1), the color of the character is "red", the font of the character is "gothic", the size of the character is "25 points", and the motion is "flashing." It is of note that the appearance shown in FIG. 4 is merely an example, and this appearance is arbitrarily determined by the system designer.

Figure 5:
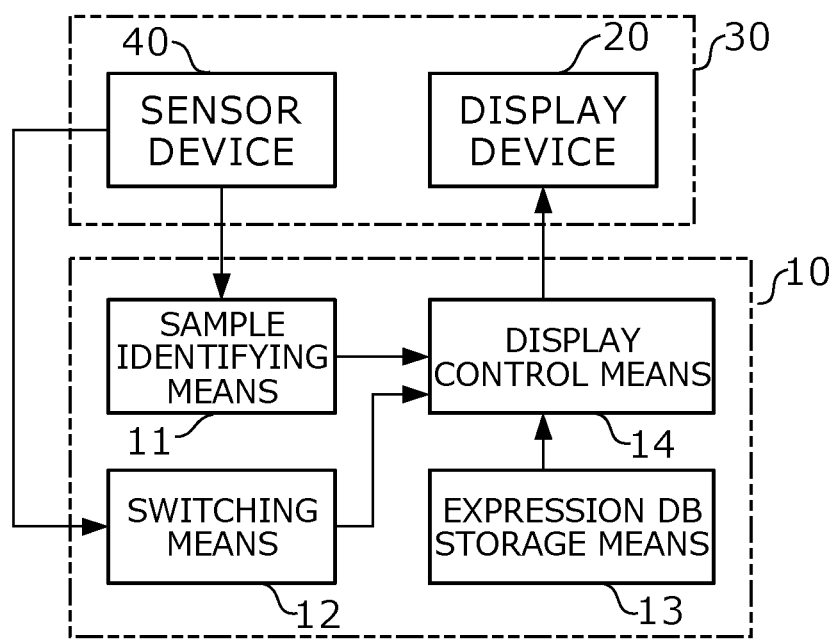
FIG. 5 is a block diagram showing an example of a functional configuration of an information processing device.

FIG. 5 is a block diagram showing an example of the functional configuration of information processing device 10. Information processing device 10 includes functions of sample identifying means 11, switching means 12, expression DB storage means 13, and display control means 14.

If sample 60 selected by the user is placed on the sensing surface of sensor device 40, sample identifying means 11 specifics which sample 60 is placed on the sensing surface based on the sample ID stored in the tag 61 of sample 60 and read by the sensor device 40.

If first tray 50*a* or second tray 50*b* is placed on the sensing surface of sensor device 40, switching means 12 mutually switches the single-sample display mode and the multi-sample display mode on the basis of the tray ID stored in tag 51*a* of first tray 50*a* or tag 51*b* of second tray 50*b* and read by the sensor device 40.

In the single-sample display mode and the multi-sample display mode, display control means 14 controls display device 20 to display a group of expressions relating to the olfactory sense stimulated by sample 60 specific by sample identifying means 11 in the display region corresponding to the periphery of the position where sample 60 is placed, i.e., the sensing surface, in the user interface device 30. At this time, display control means 14 displays the expression with an appearance corresponding to sample 60 specific by sample identifying means 11 in the expression DB (FIG. 4)

stored in expression DB storage means 13. The display area corresponding to the periphery of the position where sample 60 is placed is, for example, a circular area having a radius of 30 cm or less with respect to the sensing surface on which sample 60 is placed.

In the single-sample display mode, if the user selects one of the expressions in the displayed expression group, display control means 14 displays a relationship image, which is an image indicating the relationship between the selected expression and other samples 60 corresponding to the sense of smell associated with the expression. In addition, in the multi-sample display mode, display control means 14 controls to display, for each of plural samples 60 identified by sample identifying means 11, a group of expressions relating to the sense of smell stimulated by each of the samples 60, and to display the expression common to plural samples 60 among the group of expressions so as to be distinguishable from the expression common to plural samples 60. The display control by display control means 14 will be described in detail later with reference to FIGS. 7 to 13.

Operation

Figure 6:
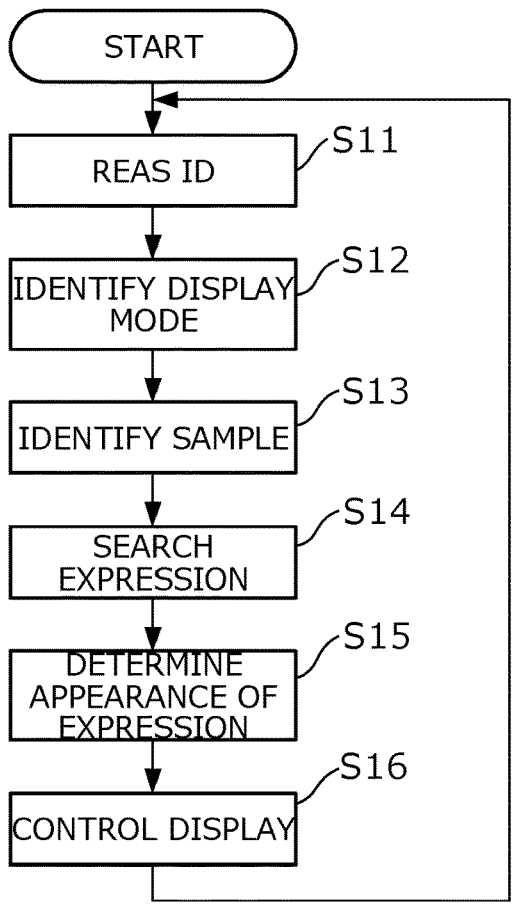
FIG. 6 is a flowchart showing an example of the operation of the information processing device.
Figure 7:
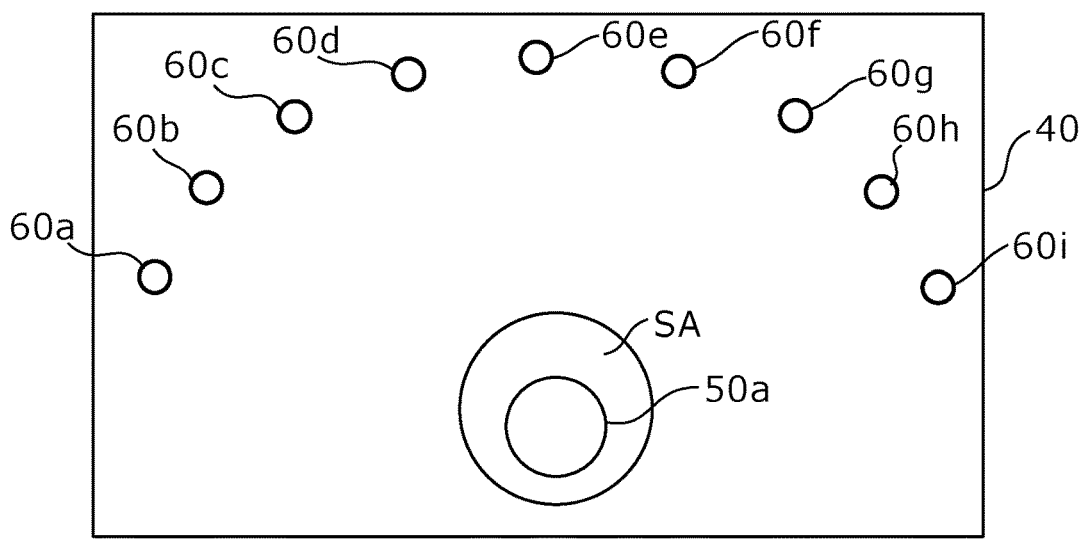
FIG. 7 is a plan view illustrating a state when the user interface surface of the user interface device is viewed from above, during the information providing system is used.

Next, the operation of the present embodiment will be described with reference to the flowchart shown in FIG. 6. FIG. 7 is a plan view showing the user interface surface of the user interface device 30 viewed from above. Plural samples 60 (nine samples 60*a* to 60*i* are shown in FIG. 7) are placed at predetermined positions on the user interface surface. Which sample 60 is to be placed at which position is determined in advance, and an image indicating the position where each sample 60 is to be placed (e.g., an image indicating the same ID as the ID of sample 60) is displayed on the user interface surface (i.e., the display surface). The user places each sample 60*a*-60*i* at the position indicated by the images. It is assumed that the correspondence between each sample 60 and the position where sample 60 is placed is stored in advance in expression DB storage means 13.

If first tray 50*a* is placed on the sensing surface SA as shown in FIG. 7, switching means 12 of information processing device 10 determines (in step S11) that first tray 50*a* is placed on the basis of the reading result of the tray ID by sensor device 40, and switches (in step S12) the display mode to the single-sample display mode. Although the position, shape, and size of the sensing surface by sensor device 40 are arbitrarily determined, the user knows in advance where the sensing surface is located in the user interface device 30, or informs the user of the method by means of display, voice guidance, or the like.

The user may select any of the samples 60*a*-60*i* to smell the smell and place sample 60 of the smell he or she prefers on first tray 50*a* on the sensing surface SA. Sample identifying means 11 of information processing device 10 identifies (in step S13) which sample 60 is placed on the sensing surface, based on the reading result (in step S13) of the sample ID by sensor device 40.

In step S14, display control means 14 searches (in step S14) the expression DB for an expression corresponding to the sample ID using the identified sample ID as a key. In step S15, display control means 14 determines whether the display mode is the single-sample display mode or the multi-sample display mode and the display mode corresponding to each of the searched expressions with reference to the expression DB. Then, display control means 14 controls display device 20, the display area around the sensing surface SA, the display area retrieved in step S14, and displays (in step S16) the display mode determined in step S15.

Figure 8:
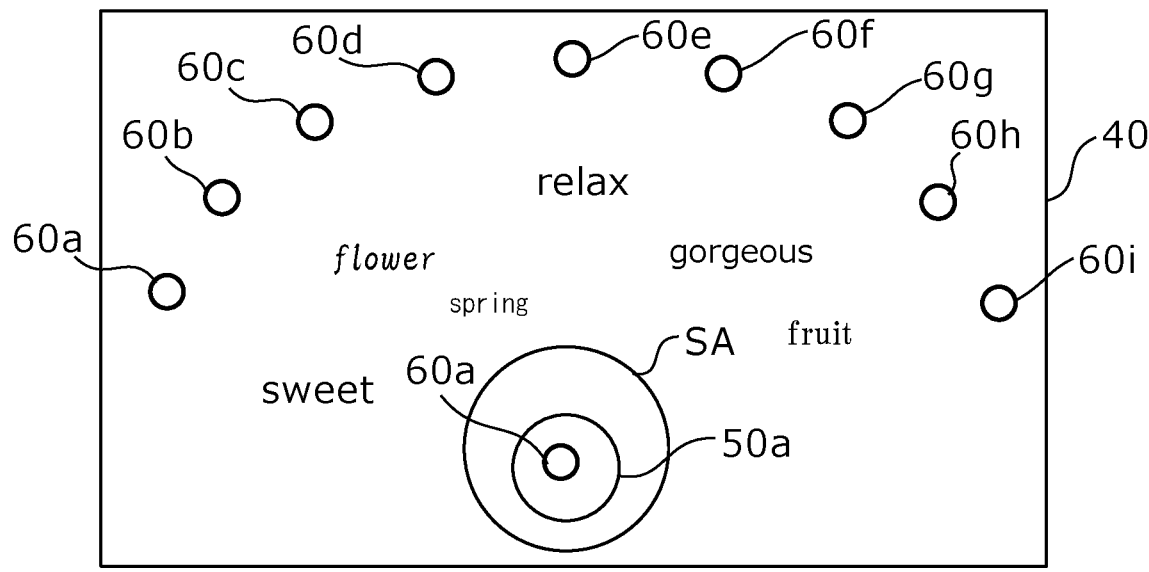
FIG. 8 is a plan view illustrating a state when the user interface surface of the user interface device is viewed from above, during the information providing system is used.

For example, if sample 60*a* is placed on first tray 50*a*, as shown in FIG. 8, a expression of the smell of sample 60*a* is displayed within a fan shape of an arbitrary size centered on, for example, the sensing surface, i.e., the position where sample 60*a* is placed. The appearance of each expression at this time is an appearance corresponding to the relationship between the expression and sample 60*g*. The user can know how to express the smell of sample 60*a* while watching these expressions. At the same time, the user can also know the relationship between the smell of sample 60*g* and each expression with reference to the appearance of each expression. For example, in the example of FIG. 8, the user can recognize that the smell of sample 60*a* is typically a smell expressed as "sweet" or "relaxation", but also a component of the smell expressed as "flower", "flower" or "fruit", and further an abstract event such as "spring" is associated from the smell.

Further, if there is any expression of the smell which the user is concerned about in the displayed expression group, the user selects the expression by performing an operation of touching the expression. If such a touch operation is performed, display control means 14 identifies the expression selected by the user based on the position at which the touch operation is performed and the display position of each expression. In this case, the expression is surrounded by some graphic image, the background of the expression is displayed in a specific color, or the expression is highlighted so that the user can know which expression selection is accepted.

Then, display control means 14 searches the expression DB for the sample ID associated with the selected expression. As a result of the search, if there is a sample ID associated with the selected expression, display device 20 is controlled to display a relationship image in step S16. The relational image is, for example, an image showing the relationship between the expression selected by the user in the user interface plane and other sample 60 corresponding to the retrieved sample ID, and is an image corresponding to the position where sample 60 is placed.

Figure 9:
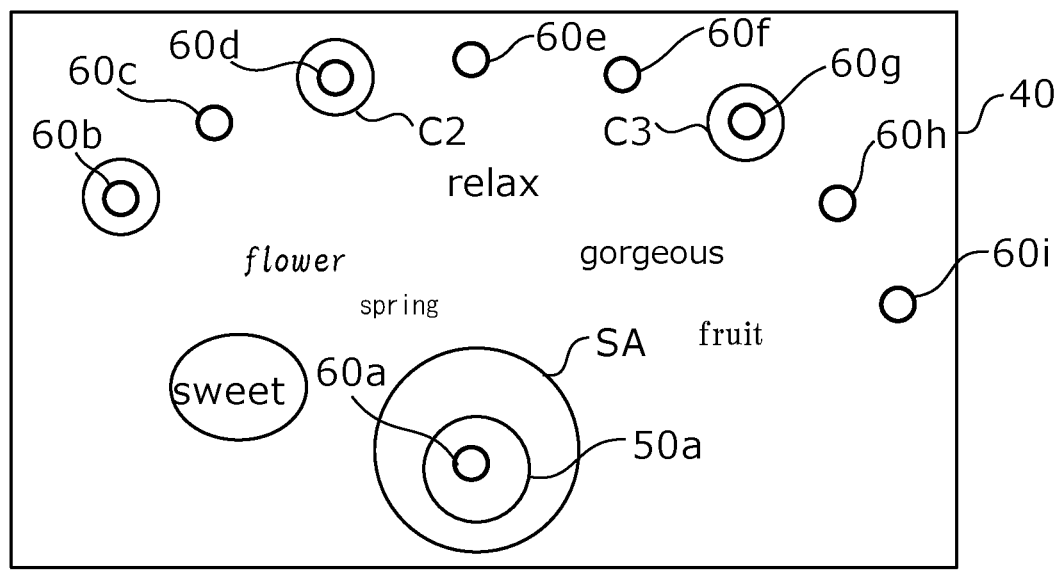
FIG. 9 is a plan view illustrating a state when the user interface surface of the user interface device is viewed from above during the information providing system is used.

For example, as illustrated in FIG. 9, if the expression "sweet" is selected by the user, an annular image surrounding the expression "sweet" is displayed, and an annular image surrounding the position of other samples (here, samples 60*b*, 60*d*, and 60*g*) represented by the expression "sweet" is displayed. By displaying such an annular image (related image), the user can know that there are samples 60*b*, 60*d*, and 60*g* in addition to sample 60*a* as the smell expressed as "sweet".

The appearance such as the color, thickness, size, and motion of the relationship image may correspond to the relation between the expression selected by the user and other samples represented by the expression. For example, if the relationship between the expression selected by the user and the other samples represented by the expression is strong, the display mode includes a color, a thickness, a size, a motion, or the like in which the relationship image becomes more conspicuous, and if the relationship is weak, the appearance becomes the opposite.

If the user wants to know more about the expression, by performing an operation of touching the expression, the process described above is then performed for another expression.

Here, from the state of FIG. 9, it is assumed that the user removes sample 60*a* from the top of first tray 50*a*, smells the smell of another sample related to "sweet", and places, for example, sample 60*b* on first tray 50*a* on the sensing surface SA as a sample of the smell that he/she prefers. Sample identifying means 11 identifies (in step S13) that sample 60b is placed on the sensing surface based on the result (in step S11) of reading the sample ID by sensor device 40.

Figure 10:
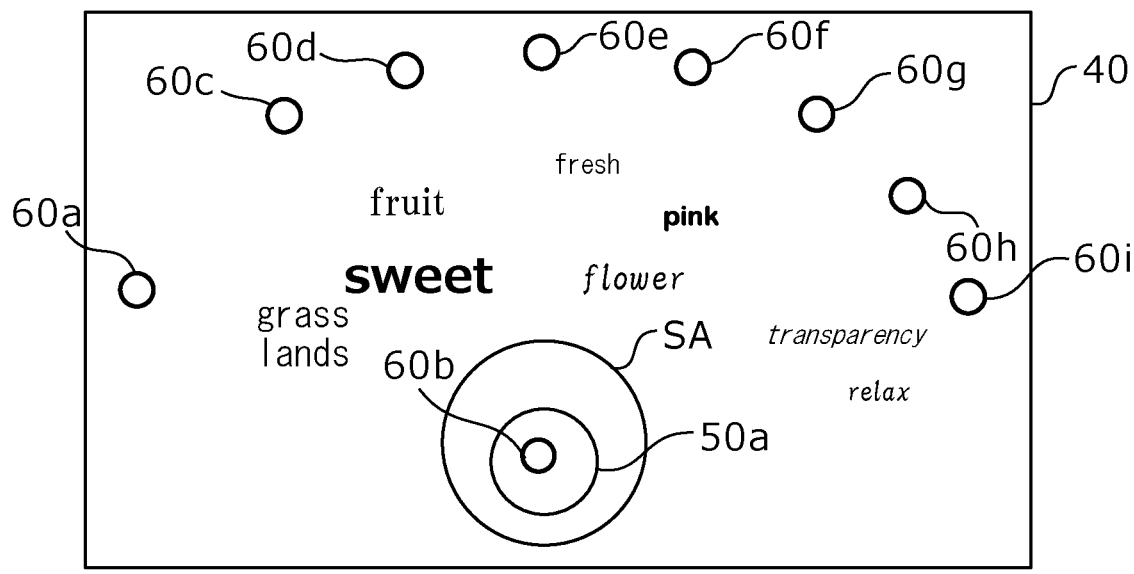
FIG. 10 is a plan view illustrating a state when the user interface surface of the user interface device is viewed from above, during the information providing system is used.
Figure 11:
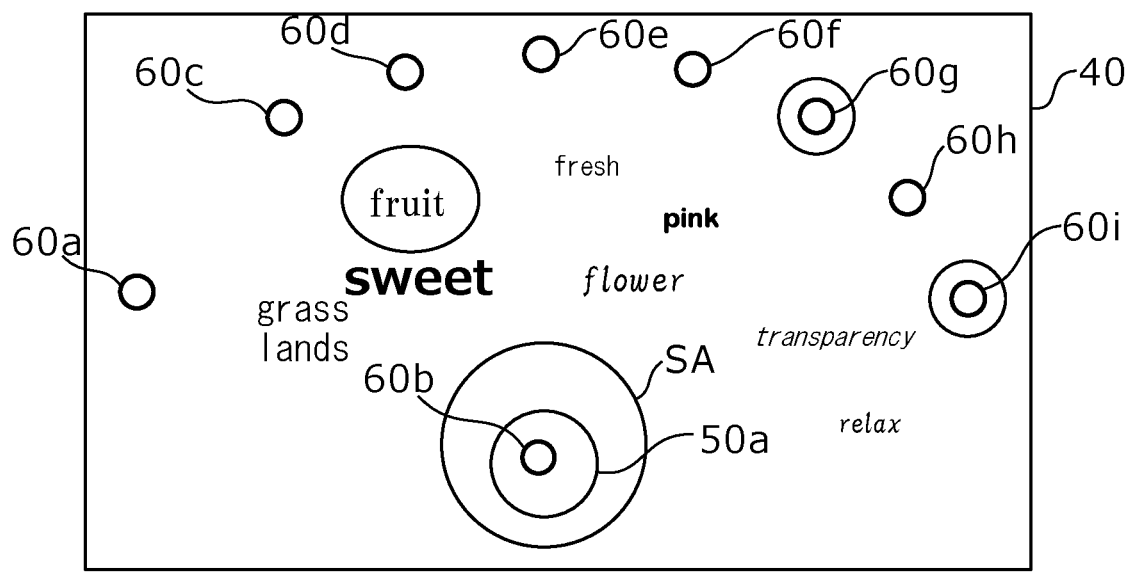
FIG. 11 is a plan view illustrating a state when the user interface surface of the user interface device is viewed from above, during the information providing system is used.

Thus, as shown in FIG. 10, the expression relating to the smell of sample 60b is displayed inside the fan figure centered on the sensing surface (step S16). The user can know how to express the smell of sample 60b while viewing these expressions. Further, when the user performs an operation of touching the "fruit" as the expression of the smell which the user is concerned about in the displayed expression group, as shown in FIG. 11, a ring image surrounding the expression of the "fruit" is displayed, and a ring image surrounding the position of another sample (here, samples 60g and 60i) represented by the expression of the "fruit" is displayed. The user can know that samples 60g and 60i are present in addition to sample 60b as the smell expressed as "fruit". In FIG. 11, an annular image surrounding the position of sample 60a which is a sample represented by the expression "fruit" is not displayed. In this regard, in a series of operations, sample 60 placed on the sensing surface in the past is stored in the expression control unit 14, and sample 60 placed in the past may not be displayed as illustrated in FIG. 11, or sample 60 placed in the past may also be displayed as an annular image.

In addition, from the state of FIG. 11, a user removes sample 60b from above the first tray to sniff the smell of other samples associated with the "fruit" and as a sample of the smell he likes, e.g., 60g of sample, on top of first tray 50a of sensing surface SA. Sample identifying means 11 of information processing device 10, based on the reading result (in step S11) of the sample ID by sensor device 40, identifies (in step S13) that sample 60g is placed on the sensing surface.

Figure 12:
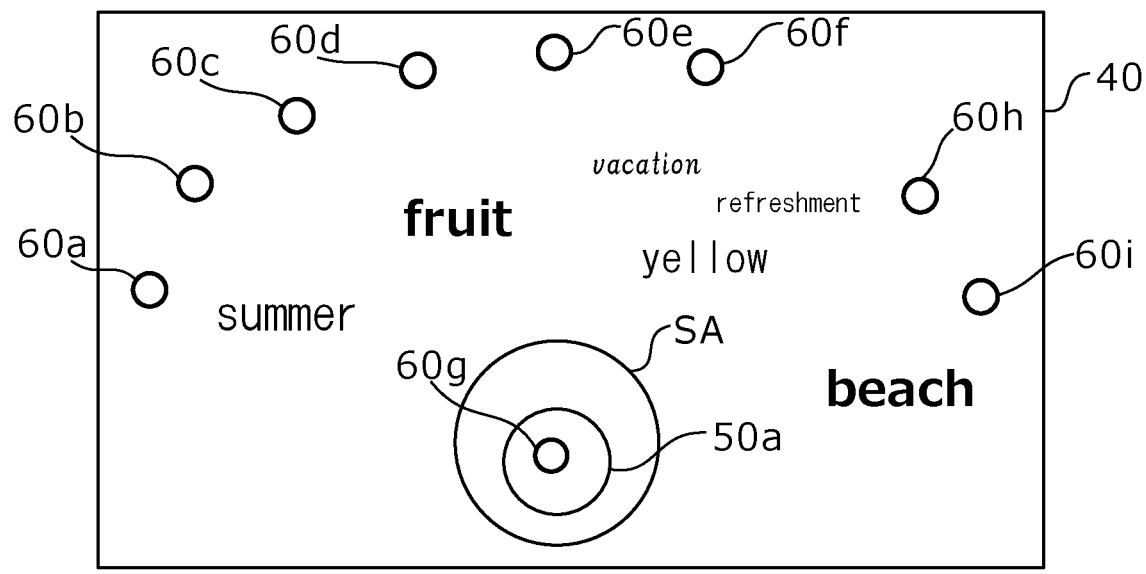
FIG. 12 is a plan view illustrating a state when the user interface surface of the user interface device is viewed from above, during the information providing system is used.

As a result, as shown in FIG. 12, the expression relating to the smell of sample 60g is displayed inside the fan figure centered on the sensing surface in step S16. The user can know how to express the smell of sample 60g while viewing these expressions. By passing the display processing in the single-sample display mode as described above a plurality of times, the user can know that the samples 60a, 60b, and 60g are samples of the smell that he/she prefers.

Next, the user lays second tray 50b on first tray 50a on the sensing surface SA. Switching means 12 of information processing device 10 determines that first tray 50a and second tray 50b are placed on the basis of the reading result (in step S11) of the tray ID by sensor device 40, and switches (in step S12) the display mode to the plurality of sample display modes.

Next, the user places the selected samples 60a, 60b, and 60g as a sample of the smell that they prefer in the single-sample display mode over first tray 50a and second tray 50b on the sensing surface SA. Sample identifying means 11 of information processing device 10, based on the reading result (in step S11) of the sample ID by sensor device 40, sample 60a, 60b, to identify (in step S13) that 60g is placed on the sensing surface.

Figure 13:
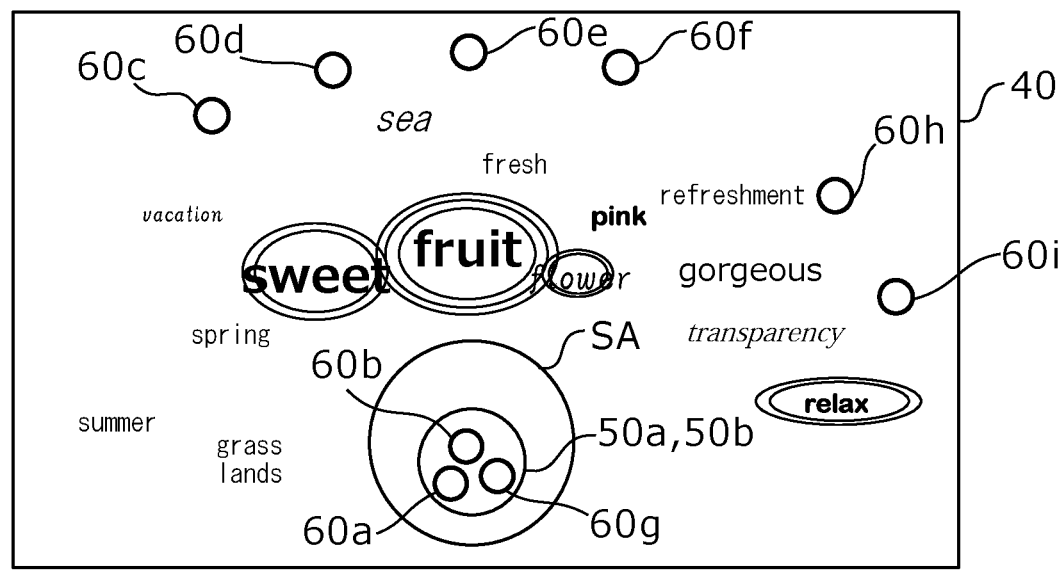
FIG. 13 When the information providing system is used, it is a plan view illustrating a state when the user interface surface of the user interface device is viewed from above.

In step S14, display control means 14 searches the expression DB for the expression corresponding to the sample ID by using the identified sample IDs of the samples 60a, 60b, and 60g as keys. In step S15, display control means 14 determines whether the display mode is the single-sample display mode or the multi-sample display mode and the display mode corresponding to each of the searched expressions with reference to the expression DB. In step S16, display control means 14 controls display device 20 to display the expression retrieved in step S14 for each of the samples 60a, 60b, and 60g in the display area around the sensing surface SA in the display mode determined in step S15. Further, at this time, display control means 14 controls display device 20 to display a expression common to the samples 60a, 60b, and 60g so as to be distinguishable from a expression not common to the samples 60a, 60b, and 60g. For example, as illustrated in FIG. 13, if the expression "fruit" is a common expression in the samples 60a, 60b, and 60g, a triplet circular ring image surrounding the expression "fruit" is displayed. If the expressions "sweet", "flower" and "relax" are all common expressions in the samples 60a and 60b, a double ring image surrounding the expressions "sweet", "flower" and "relax" is displayed. The other expressions "fresh," "sea," "pink," "refreshment," "flower," "transparency," "sea," "vacation," "spring," "summer," and "grassland" are not common expressions in any two or more of the samples 60a, 60b, and 60g, and therefore, the above-mentioned ring image is not displayed. By confirming the common expression of plural samples 60 selected by such a user, it is possible to more clearly understand what smell the user himself/herself prefers.

According to the embodiment described above, the user can visually grasp the relationship between the smell of the object and the expression of the smell. In addition, users can visually understand what kind of smell they prefer.

MODIFICATION

The present invention is not limited to the embodiments described above. The embodiment described above may be modified as follows. Further, the following two or more modified examples may be implemented in combination.

First Modification

The present invention is applicable not only to the smell sense but also to the taste sense (e.g., wine, sake, spice, seasoning, etc.). That is, the present invention may be implemented by replacing the "smell" in the embodiment with the "taste".

Second Modification

The appearance to display each expression may correspond to the relationship between the expression and the user who sees the display of the expression. The relationship between the expression and the user includes, for example, the degree of agreement between the smell of the smell expression by the expression and the user's preference related to the smell, and a history in which the user uses the expression as an expression of the smell. For example, for a user who prefers a "sweet" smell, an example may be considered in which the expression "sweet" is displayed near sample 60 placed on the sensing surface of sensor device 40, the expression "sweet" is displayed in a large or noticeable color, or the expression "sweet" is displayed so as to be noticeable by moving in a vibrating manner. In this case, the user's preferences related to smell is stored in advance collected and database in the auxiliary storage device 104 or the like, display control means 14 shall refer to it.

Further, for example, for a user who has used the expression "sweet" in many cases in the past, there may be considered an example in which the expression "sweet" is displayed near sample 60 placed on the sensing surface of sensor device 40, the expression "sweet" is displayed in a large or conspicuous color, or the expression "sweet" is displayed so as to be conspicuous by moving so as to vibrate.

In this case, the history of the expression used by the user for the smell is stored in advance in the auxiliary storage device 104 and the like is collected and stored in a database, display control means 14 shall refer to it.

Third Modification

The appearance at the time of displaying each expression may correspond to the attribute of the smell expression by the expression. Attributes of the smell include, for example, whether it is a top note, a middle note, or a last note, intensity/weakness of stimulus of the smell, attractiveness, peculiarity, or scarcity of the smell. The top note, middle note, and initial note are the first perceived smell in time, the next perceived smell, and the next perceived smell as the smell changes. For example, examples of displaying expressions corresponding to top notes, middle notes, and last notes in order from near to far of sample 60 placed on the sensing surface of sensor device 40, and examples of switching the display of expressions corresponding to top notes, middle notes, and last notes in chronological order are conceivable. In addition, examples of expressions relating to a smell with a strong stimulus or a rare smell may be displayed in a specific color, font, or motion.

Fourth Modification

The appearance at the time of displaying each expression may correspond to the attribute of the expression. The expression attributes include, for example, an image to be received from an expression, an expression of a part of speech, a type of character to be used for expression (hiragana, katakana, kanji, alphabet, etc.), the number of characters/the number of words to be used in the expression, and the like. For example, an example in which the expression "sweet" is displayed in a warm color is conceivable.

Fifth Modification

If displaying the above-mentioned related image (see FIG. 9), display control means 14 may display the related image in a display manner according to the user's preference for the smell expression by the expression selected by the user. For example, in a relational image emphasizing the expression "sweet" selected by the user and other samples represented by the expression, the appearance such as a color, a thickness, a size, a motion, and the like is changed in accordance with the user's preference for the "sweet" smell. Specifically, in the case where the user prefers a "sweet" smell, an example in which an appearance such as a color, a thickness, a size, a motion, or the like in which a relationship image becomes more conspicuous is conceivable. In this case, the user's preferences related to smell is stored in advance collected and database in the auxiliary storage device 104 or the like, display control means 14 shall refer to it. Note that the relationship image is not limited to the image illustrated in FIG. 9, and any image may be used as long as it can be understood that the expression selected by the user and the sample represented by the expression are related to each other.

Sixth Modification

Display control means 14 may display expressions having good compatibility in a display manner such that expressions having good compatibility can be identified by color, motion, or the like when displaying expressions for each of plural samples 60. For example, with respect to sample 60 corresponding to the expression "sweet" and sample 60 corresponding to the expression "marana", on the assumption that "sweet" and "marana" are compatible, the expressions "sweet" and "marana" are displayed in the same color, and the expressions having no good relationship with each other are displayed in different colors. Similarly, display control means 14 may display expressions that are incompatible with each other in a display manner that can be identified by color or motion. For example, with respect to sample 60 corresponding to the expression "sweet" and sample 60 corresponding to the expression "bitter", on the assumption that "sweet" and "bitter" are incompatible with each other, an example may be considered in which the expressions "sweet" and "bitter" are displayed in the same violent movement, and the expression having no incompatible relationship is displayed without movement. In this manner, display control means 14 may display the expression having a predetermined relationship among the expression relating to the first object and the expression relating to the second object in a display manner distinguishable from the expression not having the predetermined relationship. The expression in which a plurality of expressions are in a predetermined relationship referred to herein may be, in addition to the relationship of good/bad compatibility as described above, an example in which any of the plurality of expressions matches/does not match the preference of the user or belongs/does not belong to the expression group of similar smells. In this case, the user's preferences and similar smell expression group about the smell is stored in advance in the collection and database in the auxiliary storage device 104 or the like, display control means 14 shall refer to it.

Seventh Modification

In the above embodiment, switching means 12 switches to the "single-sample display mode" if first tray 50a is placed on the sensing surface, and switches to the "multi-sample display mode" if first tray 50a and second tray 50b are placed on the sensing surface. The method of using the tray as the operation tool for switching the display mode is not limited to the example of the above embodiment. For example, only one tray provided with a tag storing a tray ID may be prepared, and switching means 12 may switch to the "single-sample display mode" if the tray is not placed on the sensing surface, and may switch to the "multi-sample display mode" if the tray is placed on the sensing surface. Conversely, switching means 12 may switch to the "single-sample display mode" if the tray is placed on the sensing surface, and switch to the "multi-sample display mode" if the tray is not placed on the sensing surface. As described above, if the tray is placed at a predetermined position of the user interface device 30, switching means 12 reads a tag provided in the tray, and switches between the first display mode called a single-sample display mode and the second display mode called a multi-sample display mode.

Eighth Modification

The display device and the operation device is not limited to display device 20 and sensor device 40 illustrated in FIG. For example, the display device may project an image onto a certain display surface. Further, the display device may be intended to display an image on the wall surface (including the case of projecting an image on the wall surface or the wall itself is a display device). The display device may also be a display device that realizes so-called augmented reality. Specifically, if sample 60 is imaged by an imaging device of a smart phone, tablet, or glass type wearable device, a corresponding expression group may be displayed around sample 60 in the imaged image. The operation device may be a device that detects a user's operation using an image recognition technique.

Ninth Modification

In the embodiment, the expression relating to sample 60 is displayed if sample 60 is placed on the sensing surface of sensor device 40, but the expression relating to sample 60 may be displayed if the user opens the lid of the capped vial containing aroma oil corresponding to sample 60, for example. Similarly, for example, a transparent cover may be put on a dish with a natural object itself, and if the user removes the transparent cover, a expression relating to the smell of the natural object may be displayed. Such user actions can be detected, for example, using well-known image recognition techniques.

Tenth Modification

The display form of the expression may be a two-dimensional display or a three-dimensional display. The displayed "expression" is not limited to characters, and may be a color, an abstract image, an image such as a person/scene, or the like.

The present invention may be provided as an information processing method including steps of processing performed in information processing device 10. The present invention may also be provided as a program executed in information processing device 10. Such a program can be provided in the form of being recorded on a recording medium such as an optical disk, or in the form of being downloaded to a computer via a network such as the Internet and installed and made available.

While the present invention has been described in detail above, it is apparent to those skilled in the art that the present invention is not limited to the embodiments described herein. The present invention may be practiced as modifications and modifies without departing from the spirit and scope of the invention as defined by the appended claims. Accordingly, the description herein is for illustrative purposes and does not have any limiting meaning on the present invention.

DESCRIPTION OF REFERENCE NUMERALS

1 . . . Information-providing systems, 20. display devices, 30. user-interface devices, 40. sensor devices, 50*a*. first tray, 51*a*. tag, 50*b*. second tray, 51*b*. tag, 60, 60*a*-60*i*. sample, 61. tag, 101 . . . CPU, 102 . . . ROM, 103 . . . RAM, 104. secondary storage device, 105. communication IF, 11. sample identifying means, 12. switching means, 13. expression DB storage unit, 14. display control means.

The invention claimed is:

1. An information processing device comprising:
a processor and a memory operably coupled to the processor, the processor being configured to:
identify an object selected by a user among a plurality of objects that stimulate the user's sense of smell or taste;
control a display to display an expression group with plural character strings that each express the sense of smell or taste stimulated by the identified object;
switch between a first display mode and a second display mode;
display, in the first display mode, the expression group relating to the identified object, and
display, in the second display mode, multiple expression groups each with plural character strings that each express to the sense of smell or taste for one of the plurality of objects, and display an expression common to the plurality of objects among the expression groups so as to be distinguishable from expressions not common to the plurality of objects,
wherein each of the plurality of objects is associated with a different set of character strings.

2. The information processing device according to claim 1, wherein
the processor is configured to:
display a relationship image, which is an image indicating a relationship between a selected expression and another object corresponding to the sense of smell or taste associated with the selected expression, in a case that any one of the displayed expression groups is selected by the user.

3. The information processing device according to claim 2, further comprising a user interface device, wherein
when a plurality of objects corresponding to the sense of smell or taste are placed on the user interface device,
the processor is configured to control to:
display, in the first display mode, the expression group relating to the identified object, around a predetermined position where the object is placed, and
display, on the user interface device, an image indicating the relationship between the selected expression and another object corresponding to the sense of smell or taste associated with the expression, which is an image corresponding to the position where the other object is placed, in a case that any one of the displayed expression groups is selected by the user.

4. A non-transitory computer readable storage medium that stores a program to implement functions when executed on a computer, the functions comprising:
identifying an object selected by a user among a plurality of objects that stimulate the user's sense of smell or taste;
displaying an expression group with plural character strings that each express the sense of smell or taste stimulated by the identified object;
switching between a first display mode and a second display mode, and
displaying, in the first display mode, the expression group relating to the identified object, and
displaying, in the second display mode, multiple expression groups each with plural character strings that each express the sense of smell or taste for one of the plurality of objects, and display an expression common to the plurality of objects among the expression group so as to be distinguishable from expressions not common to the plurality of objects,
wherein each of the plurality of objects is associated with a different set of character strings.

5. An information providing system comprising:
a user interface device; and
an information processing device including a processor configured to:
identify an object selected by a user among a plurality of objects that stimulate the user's sense of smell or taste;

control a display to display an expression group with plural character strings that each express the sense of smell or taste stimulated by the identified object;

switch between a first display mode and a second display mode;

display, in the first display mode, the expression group relating to the identified object; and display, in the second display mode, multiple expression groups each with plural character strings that each express the sense of smell or taste for one of the plurality of objects, and display an expression common to the plurality of objects among the expression groups so as to be distinguishable from expressions not common to the plurality of objects, wherein each of the plurality of objects is associated with a different set of character strings.

6. The information provision system according to claim 5, further comprising:

an object tag, which is a tag provided in each of the objects and storing identification information, a tray tag which is a tag provided on a tray on which the object is placed and which stores identification information, wherein the processor is configured to identify the objects by reading the object tag provided on the object to identify the object in a case that any of the plurality of objects is placed at a predetermined position of the user interface device, and identify, in a case that the tray is placed in a predetermined position of the user interface device, the processor reads the tray tag provided in the tray to switch between the first display mode and the second display mode.

* * * * *